US011128460B2

(12) United States Patent
Perlman et al.

(10) Patent No.: US 11,128,460 B2
(45) Date of Patent: Sep. 21, 2021

(54) CLIENT-SIDE ENCRYPTION SUPPORTING DEDUPLICATION ACROSS SINGLE OR MULTIPLE TENANTS IN A STORAGE SYSTEM

(71) Applicant: EMC IP Holding Company LLC, Hopkinton, MA (US)

(72) Inventors: Radia J. Perlman, Redmond, WA (US); Charles Kaufman, Redmond, WA (US); Xuan Tang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 244 days.

(21) Appl. No.: 16/208,790

(22) Filed: Dec. 4, 2018

(65) Prior Publication Data

US 2020/0177382 A1 Jun. 4, 2020

(51) Int. Cl.

*H04L 29/06* (2006.01)
*H04L 29/08* (2006.01)
*H04L 9/32* (2006.01)
*H04L 9/08* (2006.01)
*H04L 9/14* (2006.01)

(52) U.S. Cl.

CPC .......... *H04L 9/0894* (2013.01); *H04L 9/0861* (2013.01); *H04L 9/14* (2013.01); *H04L 9/3242* (2013.01)

(58) Field of Classification Search

CPC ................ H04L 9/14; H04L 9/08; H04L 9/32
USPC .......................................................... 713/193
See application file for complete search history.

(56) References Cited

U.S. PATENT DOCUMENTS 6,577,734 B1 6/2003 Etzel et al.
7,814,318 B1 10/2010 Perlman et al.
(Continued)

FOREIGN PATENT DOCUMENTS

EP 1414181 A1 4/2004

OTHER PUBLICATIONS

Wikipedia, "Convergent Encryption," www.en.wikipedia.org/wiki/Convergent_encryption, Mar. 14, 2018, 2 pages.
(Continued)

*Primary Examiner* — Haresh N Patel
(74) *Attorney, Agent, or Firm* — Ryan, Mason & Lewis, LLP

(57) ABSTRACT

An apparatus in an illustrative embodiment comprises a client device configured for communication with a storage system, with the client device comprising a processor coupled to a memory. The client device is further configured to identify a data item to be stored in the storage system, and to generate a data encryption key for the data item as a function of a first secret key and the data item. For example, the function may comprise hashing at least the data item. The client device is further configured to encrypt the data item using the data encryption key for the data item, and to send the encrypted data item to the storage system for storage therein. The client device in some embodiments is further configured to encrypt the data encryption key using a second secret key, and to send the encrypted data encryption key to the storage system for storage therein as metadata of the data item.

20 Claims, 3 Drawing Sheets

(56) References Cited

U.S. PATENT DOCUMENTS 8,490,162 B1 * 7/2013 Popoveniuc ............ H04L 63/08 726/5
8,650,657 B1 2/2014 Shankar et al.
9,064,135 B1 6/2015 Poo et al.
9,071,429 B1 6/2015 Roth et al.
9,076,004 B1 7/2015 Bogorad
9,195,851 B1 * 11/2015 Chandra ............... H04L 9/0825
9,251,097 B1 2/2016 Kumar et al.
9,659,190 B1 5/2017 Perlman et al.
9,779,269 B1 10/2017 Perlman
9,906,361 B1 2/2018 Perlman et al.
2003/0002668 A1 1/2003 Graunke et al.
2005/0018853 A1 1/2005 Lain et al.
2006/0282666 A1 12/2006 Kim
2006/0288232 A1 12/2006 Ho et al.
2007/0130615 A1 6/2007 Brace et al.
2007/0226809 A1 9/2007 Ellard
2007/0245410 A1 10/2007 Perlman et al.
2008/0072047 A1 3/2008 Sarikaya et al.
2008/0212770 A1 9/2008 Satou et al.
2009/0067620 A1 * 3/2009 Billet .................... H04L 9/0643 380/28
2009/0100272 A1 * 4/2009 Smeets ............... G06F 21/6209 713/189
2009/0110191 A1 4/2009 Sanvido et al.
2010/0054479 A1 3/2010 Kao et al.
2011/0125771 A1 * 5/2011 Gladwin ................. G06F 3/067 707/758
2011/0158405 A1 6/2011 Choi et al.
2011/0173460 A1 7/2011 Ito et al.
2011/0214160 A1 * 9/2011 Costa .................. H04L 63/0869 726/3
2011/0225428 A1 9/2011 Stufflebeam, Jr. et al.
2011/0252232 A1 10/2011 De Atley et al.
2011/0283113 A1 11/2011 Moffat et al.
2012/0072716 A1 3/2012 Hu et al.
2012/0173885 A1 7/2012 Ascar et al.
2012/0284528 A1 11/2012 Orovitz
2013/0103945 A1 4/2013 Cannon et al.
2013/0290274 A1 10/2013 Patil et al.
2013/0305057 A1 11/2013 Greco et al.
2013/0322621 A1 12/2013 Yoon et al.
2014/0006802 A1 1/2014 Cachin et al.
2014/0025963 A1 1/2014 Subramanian
2014/0068257 A1 3/2014 Burckard
2014/0068279 A1 3/2014 Kurspahic et al.
2014/0143543 A1 5/2014 Aikas et al.
2014/0283010 A1 9/2014 Rutkowski et al.
2014/0351605 A1 11/2014 De Atley et al.
2014/0359309 A1 12/2014 Cachin et al.
2015/0019870 A1 1/2015 Patnala et al.
2015/0220746 A1 8/2015 Li et al.
2015/0288512 A1 10/2015 McGregor et al.
2016/0062918 A1 3/2016 Androulaki et al.
2016/0117448 A1 * 4/2016 Van De Craen ....... G16H 10/60 705/3
2016/0154839 A1 6/2016 Bezawada et al.
2016/0323250 A1 11/2016 Winter et al.
2016/0342814 A1 * 11/2016 Wang ...................... G06F 21/64
2017/0005809 A1 1/2017 Adam et al.
2017/0118180 A1 4/2017 Takahashi
2017/0195878 A1 * 7/2017 Takemori ............ H04L 63/0428
2018/0034901 A1 * 2/2018 Shnitko ................... H04L 67/10
2018/0054302 A1 * 2/2018 Shveykin ............ H04L 63/0435
2018/0062835 A1 * 3/2018 Hamel .................. H04L 9/0894
2018/0292995 A1 * 10/2018 Tal ........................ G06F 3/0608
2019/0215155 A1 * 7/2019 Wang ........................ H04L 9/14

OTHER PUBLICATIONS

Radia Perlman, "File System Design with Assured Delete," 14th Annual Network and Distributed System Security Symposium (NDSS), Feb.-Mar. 2007, 13 pages.

U.S. Appl. No. 14/752,106 filed in the name of Radia Perlman et al. Jun. 26, 2015 and entitled "Storage System with Controller Key Wrapping of Data Encryption Key in Metadata of Stored Data Item."

* cited by examiner

200

METADATA FOR ENCRYPTED DATA ITEMS OF CLIENT 102-1 IN STORAGE ARRAY 104

| | | | |
|---|---|---|---|
| DATA ITEM ID1 | $\{DEK1\}S_A$ | POINTER | OTHER METADATA FOR ID1 |
| DATA ITEM ID2 | $\{DEK2\}S_A$ | POINTER | OTHER METADATA FOR ID2 |
| . . . | | | . . . |
| DATA ITEM IDn | $\{DEKn\}S_A$ | POINTER | OTHER METADATA FOR IDn |

FIG. 2

CLIENT-SIDE ENCRYPTION SUPPORTING DEDUPLICATION ACROSS SINGLE OR MULTIPLE TENANTS IN A STORAGE SYSTEM

FIELD

The field relates generally to cryptography, and more particularly to client-side data encryption techniques.

BACKGROUND

In many storage systems, data is stored under encryption utilizing one or more data encryption keys. Such systems are often configured to provide deduplication functionality for stored data items. Deduplication may generally refer to any of a variety of different processes designed to avoid storing duplicate data items in a storage system. The failure to implement an efficient deduplication process can be wasteful of storage resources, thereby potentially increasing storage system cost and complexity while also significantly undermining storage system performance.

Data encryption techniques implemented by a storage system are also referred to herein as “server-side” data encryption techniques, as the storage system itself encrypts data items supplied to it in plaintext form by one or more clients. Such clients are also referred to herein as “tenants” of the storage system, where the term “tenant” as broadly used herein is intended to encompass, for example, clients that are members of a common deduplication domain of the storage system. Examples of server-side data encryption techniques supporting efficient deduplication across multiple tenants are disclosed in U.S. Pat. No. 9,779,269, entitled “Storage System Comprising Per-Tenant Encryption Keys Supporting Deduplication Across Multiple Tenants,” which is incorporated by reference herein.

Other data encryption techniques include what are referred to herein as “client-side” data encryption techniques, in which the data items are encrypted by the one or more clients and supplied to the storage system in encrypted form. Unfortunately, client-side data encryption can prevent effective deduplication, as multiple encryptions of the same plaintext data item, even by the same client, usually yield different ciphertexts that cannot be perceived as duplicates by the storage system. As a result, conventional client-side data encryption techniques typically require that the encryption keys utilized by a given client device to encrypt data items for storage in the storage system are also known to the storage system if the storage system is to perform deduplication over those data items. Such deduplication issues arise regardless of whether duplicate encrypted data items are submitted for storage by a single tenant or by multiple tenants. The conventional client-side encryption arrangements are therefore unsuitable for use in those storage contexts in which single or multiple tenants do not wish to disclose their encryption keys to the storage system.

SUMMARY

Illustrative embodiments provide client-side encryption techniques that allow a storage system to implement efficient deduplication across single or multiple tenants of a storage system without such tenants disclosing their encryption keys to the storage system.

In one embodiment, an apparatus comprises a client device configured for communication with a storage system, with the client device comprising a processor coupled to a memory. The client device is further configured to identify a data item to be stored in the storage system, and to generate a data encryption key for the data item as a function of a first secret key and the data item. The client device is further configured to encrypt the data item using the data encryption key for the data item, and to send the encrypted data item to the storage system for storage therein.

In some embodiments, the function of the first secret key and the data item comprises hashing at least the data item.

By way of example, the data encryption key is illustratively generated in the client device at least in part by applying a hash function to the first secret key and the data item.

As another example, the data encryption key is illustratively generated at least in part by applying a first hash function to the data item to obtain a result, and applying a second hash function to the first secret key and the result.

As yet another example, the data encryption key is illustratively generated at least in part by applying a hash function to the data item to obtain a result, and encrypting the result using the first secret key.

Numerous other functions of the first secret key and the data item, in some cases involving hashing of at least the data item, can be used in generating the data encryption key for the data item.

As a further example, in some embodiments, hashing at least the data item comprises generating a message authentication code utilizing at least the data item.

Additionally or alternatively, hashing at least the data item illustratively comprises generating a fixed-length value utilizing at least the data item with the fixed-length value having a length that is less than a length of the data item itself.

A wide variety of other types of hashing arrangements utilizing different hash functions can be used in implementing illustrative embodiments. Terms such as “hashing” and “hash function” as used herein are therefore intended to be broadly construed. Other types of functions of the first secret key and the data item not involving hashing of at least the data item can be used in other embodiments.

The client device in some embodiments is further configured to encrypt the data encryption key using a second secret key, and to send the encrypted data encryption key to the storage system for storage therein as metadata of the data item. The metadata illustratively comprises a pointer to a storage location of the data item in the storage system, and the encrypted data encryption key is stored in association with the pointer in the metadata.

The client device in illustrative embodiments is associated with a first tenant of a deduplication domain of the storage system, and the deduplication domain includes one or more additional tenants. For example, the storage system may comprise a cloud storage system and the tenants may comprise respective tenants of the cloud storage system, although numerous other storage system arrangements are possible. References herein to “tenants” should therefore not be viewed as limited to cloud-based storage arrangements.

The above-noted first secret key in such an embodiment is not known to the storage system but is shared by the first and additional tenants of the deduplication domain. For example, the first and additional tenants of the deduplication domain may each utilize the first secret key and a common hash function in generating their respective data encryption keys so as to permit the storage system to identify duplicate encrypted data items submitted by one or more of the tenants of the deduplication domain. The common hash function illustratively comprises a particular designated secure hashing algorithm.

The above-noted second secret key in such an embodiment is not known to the storage system and is not shared by the first tenant with any of the additional tenants.

As mentioned above, some embodiments advantageously facilitate implementation of deduplication processes across one or more tenants in storage contexts that utilize client-side encryption, but without the need for any tenant to disclose its encryption keys to the storage system. For example, a deduplication process can efficiently eliminate redundant encrypted data items received from the same tenant or from different tenants. This can provide more efficient use of storage resources in multi-tenant storage systems, potentially leading to cost and complexity reductions and associated performance improvements.

These and other embodiments include, without limitation, systems, apparatus, methods and processor-readable storage media.

BRIEF DESCRIPTION OF THE DRAWINGS

FIG. 2 shows an example of metadata associated with data items subject to client-side encryption in an illustrative embodiment.

DETAILED DESCRIPTION

Illustrative embodiments of the present invention will be described herein with reference to exemplary information processing systems, client devices and storage systems. It is to be appreciated, however, that embodiments of the invention are not restricted to use with the particular illustrative information processing system, client device and storage system configurations shown. For example, the term "storage system" as used herein is intended to be broadly construed, so as to encompass, for example, storage systems each comprising one or more storage arrays or other types and arrangements of storage products as well as cloud storage systems comprising virtual infrastructure.

Figure 1:
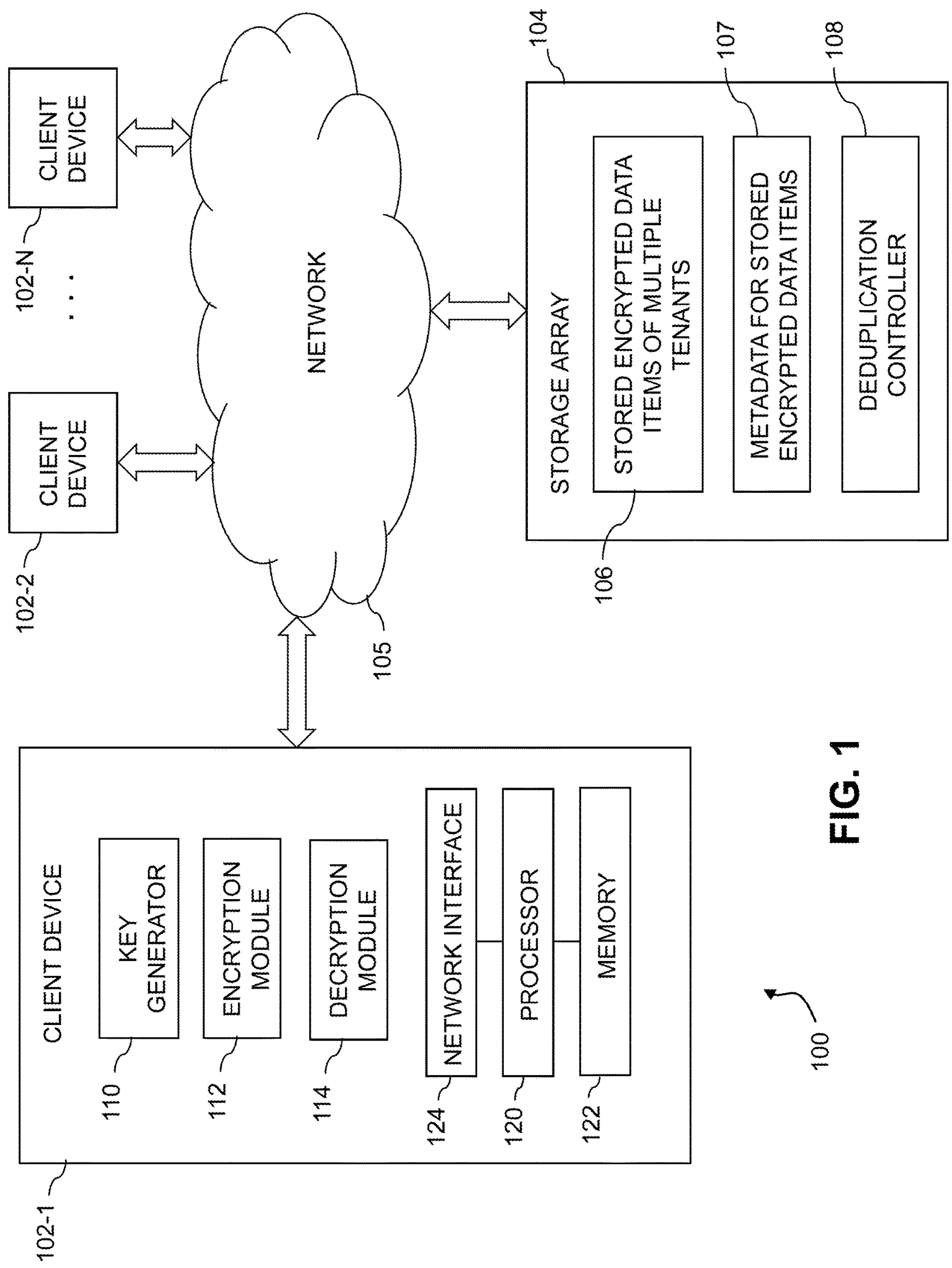
FIG. 1 is a block diagram of an information processing system configured to perform client-side encryption in a manner that supports deduplication across single or multiple tenants of a storage system in an illustrative embodiment of the invention.

FIG. 1 shows an information processing system 100 that comprises a plurality of client devices 102-1, 102-2, . . . 102-N that utilize a storage array 104. The client devices 102 communicate with the storage array 104 over a network 105. The storage array 104 comprises stored encrypted data items 106 of multiple tenants, and associated metadata 107 for the stored encrypted data items 106. The "tenants" as that term is broadly utilized herein illustratively comprise respective users associated with respective ones of the client devices 102. At least subsets of those tenants illustratively comprise respective members of at least one deduplication domain managed by a deduplication controller 108 of the storage array 104.

A given "tenant" as that term is broadly used herein can therefore refer to one of the client devices 102 and/or a corresponding user, and such a tenant may also be a member of a particular deduplication domain of the storage array 104.

The deduplication controller 108 is configured to run one or more deduplication processes in the storage array 104 in order to avoid storing duplicate data items in at least one deduplication domain of the storage array 104. In other embodiments, the deduplication controller 108 can be implemented at least in part externally to the storage array 104. For example, it can be implemented at least in part within one or more associated host devices that communicate with the storage array 104 over the network 105. The deduplication controller 108 illustratively implements, maintains or otherwise utilizes a deduplication directory to detect duplicate data items within a given deduplication domain.

In some embodiments, there is only a single deduplication domain that contains all or substantially all of the data storage space of the storage array 104. In such embodiments, all tenants of the storage array 104 are considered part of the same deduplication domain.

The deduplication controller 108 is implemented utilizing at least one processing device comprising a processor coupled to a memory. The same or different processing devices may be used to implement other portions of the storage array 104.

The deduplication controller 108 is configured to limit a total number of copies of a given data item that are stored for different ones of the tenants. For example, the deduplication controller 108 can be configured to ensure that only a single copy of a given stored encrypted data item is included in the storage array 104, even though multiple tenants have requested storage of that same encrypted data item within the system 100.

As a more particular example, the deduplication controller 108 can be configured to determine if a particular encrypted data item received from a given one of the tenants is a duplicate of an existing encrypted data item previously stored for the given tenant or another one of the tenants.

Numerous other types of deduplication are possible in the system 100. For example, the deduplication controller 108 can be configured to identify multiple copies of a given data item stored for different ones of the tenants, to delete all but a remaining one of the multiple copies and to update metadata associated with the remaining one of the multiple copies to include a pointer to the remaining single copy.

As indicated above, the storage array 104 includes stored encrypted data items 106 of multiple tenants, as well as associated metadata 107 for the stored encrypted data items 106. It should be noted that in other embodiments the associated metadata 107 or various portions thereof may be stored at alternative locations within the system 100, and such locations need not be proximate the stored encrypted data items 106 within the storage array 104.

The storage array 104 in some embodiments may be part of a cloud storage system and the multiple tenants may comprise respective tenants of the cloud storage system. In such an arrangement, encrypted data storage is provided to the tenants as a service of the service provider operating the cloud storage system. The term "tenant" as used herein should not be viewed as limited to such cloud-based storage arrangements.

The storage array 104 in some embodiments is implemented utilizing a VNX® storage array or a Symmetrix VMAX® storage array, both commercially available from Dell EMC of Hopkinton, Mass. Alternatively, the storage array 104 can be implemented utilizing a flash-based storage array such as an XtremIO™ storage array or a Unity™ storage array, both also from Dell EMC.

The storage array 104 is an example of what is more generally referred to herein as a "storage system." The term "storage system" as used herein is intended to be broadly construed, and should not be viewed as being limited to storage arrays or any other storage system of a particular type. A given storage system as the term is broadly used herein can comprise, for example, network-attached storage (NAS), storage area networks (SANs), direct-attached storage (DAS) and distributed DAS, as well as combinations of these and other storage types, including software-defined storage.

Accordingly, storage systems can be implemented using software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The stored encrypted data items 106 and associated metadata 107 are illustratively stored in general storage of the storage array 104. The storage array can additionally or alternatively include other types of storage, such as multiple different types of storage for different portions of the stored data.

The network 105 can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The network 105 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art. The term "network" as used herein is therefore intended to be broadly construed so as to encompass various protocols that utilize direct connections between the client devices 102 and the storage array 104.

The configuration of the client device 102-1 will now be described in further detail. Each of the other client devices 102-2 through 102-N is assumed to be configured in a manner similar to that described below for client device 102-1.

The client device 102-1 illustratively comprises a key generator 110, an encryption module 112 and a decryption module 114. The key generator 110 is utilized to generate data encryption keys for use in performing client-side encryption of data items for storage in the storage array 104. The key generator 110 can also be used to generate one or more secret keys that are utilized in generating data encryption keys and in encrypting data encryption keys as described in more detail elsewhere herein. The encryption and decryption modules 112 and 114 are utilized to encrypt and decrypt data items in conjunction with storage in and retrieval from the storage array 104. These modules are also used to encrypt and decrypt the data encryption keys using a secret key of the client device 102-1.

It is to be appreciated that this particular arrangement of components in the client device 102-1 is presented by way of example only, and alternative arrangements can be used in other embodiments. For example, the functionality associated with the components 110, 112 and 114 in other embodiments can be distributed across a larger number of modules, or combined into a single module.

In some embodiments, components 110, 112 and 114 are implemented in a cryptographic module of the client device 102-1. The cryptographic module can be implemented at least in part utilizing a trusted platform module or other type of trusted hardware of the client device 102-1. Such a trusted platform module provides highly secure storage for secret keys of the client device 102-1 and in some embodiments comprises or is otherwise associated with a key manager configured to control secure storage of the secret keys of the client device 102-1.

As mentioned previously, the client device 102-1 in the FIG. 1 embodiment is assumed to be implemented using at least one processing device. Each such processing device generally comprises at least one processor and an associated memory, and implements one or more functional modules for controlling certain features of the client device 102-1.

More particularly, the client device 102-1 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 122 illustratively comprises random access memory (RAM), read-only memory (ROM), flash memory or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, an integrated circuit containing electronic memory, or a wide variety of other types of computer program products comprising processor-readable storage media. The term "article of manufacture" as used herein should be understood to exclude transitory, propagating signals.

The network interface 124 allows the client device 102-1 to communicate with the storage array 104 over the network 105. The network interface 124 illustratively comprises one or more conventional transceivers.

Particular components of the client device 102-1, such as one or more of key generator 110, encryption module 112 and decryption module 114, are illustratively implemented at least in part in the form of software that is stored in memory 122 and executed by processor 120.

As mentioned previously, the components 110, 112 and 114 are utilized in performing client-side encryption and decryption operations relating to the stored encrypted data items 106 and the associated metadata 107 of the storage array 104.

Such operations in the present embodiment illustratively involve generating data encryption keys and utilizing those data encryption keys to encrypt respective ones of the data items for storage in the storage array 104. The resulting encrypted data item is stored in the storage array 104 as one of the stored encrypted data items 106. Furthermore, the given encrypted data item as stored in the stored encrypted data items 106 has its corresponding metadata stored in the associated metadata 107. That corresponding metadata includes the particular data encryption key encrypted using a secret key of the client device 102-1.

In some embodiments, the client device 102-1 is configured to identify a data item to be stored in the storage array 104, to generate a data encryption key for the data item as a function of a first secret key and the data item, to encrypt the data item using the data encryption key for the data item, and to send the encrypted data item to the storage array 104 for storage therein.

The client device 102-1 is illustratively further configured to encrypt the data encryption key using a second secret key, and to send the encrypted data encryption key to the storage array 104 for storage therein as metadata of the data item.

The function of the first secret key and the data item illustratively comprises hashing at least the data item, although other types of functions can be used in other embodiments.

For example, the data encryption key is illustratively generated at least in part by applying a hash function to the first secret key and the data item. Alternatively, the data encryption key is generated at least in part by applying a first hash function to the data item to obtain a result, and applying a second hash function to the first secret key and the result, where the first and second hash functions can be the same hash function or different hash functions. In other embodiments, the data encryption key is generated at least in part by applying a hash function to the data item to obtain a result, and encrypting the result using the first secret key.

A wide variety of other types of hashing can be used, and terms such as "hashing" and "hash function" as used herein are intended to be broadly construed.

For example, hashing at least the data item in some embodiments comprises generating a message authentication code (MAC) utilizing at least the data item.

The hashing of at least the data item can additionally or alternatively be characterized as generating a fixed-length value utilizing at least the data item, with the fixed-length value having a length that is less than a length of the data item itself, and more specifically substantially less than the length of the data item.

Other embodiments can use different functions of the first secret key and the data item that do not necessarily involve hashing of at least the data item.

Although some embodiments assume that a unique data encryption key is used for each unique data item, it is possible in other embodiments to utilize the same data encryption key for multiple data items. For example, a single data encryption key can be generated in the manner described above for multiple data items and used to encrypt those multiple data items. A given such set of multiple data items is also considered a "data item" as that particular term is broadly used herein.

In some embodiments, the client device 102-1 is associated with a first tenant of a deduplication domain of the storage array 104 and the deduplication domain includes one or more additional tenants, possibly associated with respective other ones of the client devices 102-2 through 102-N.

The above-noted first secret key in an embodiment of this type is not known to the storage array 104 but is shared by the first and additional tenants of the deduplication domain. The first and additional tenants of the deduplication domain each utilize the first secret key and a common hash function in generating their respective data encryption keys so as to permit the storage array 104 to identify duplicate encrypted data items submitted by one or more of the tenants of the deduplication domain.

The common hash function illustratively comprises a particular designated secure hashing algorithm, such as SHA1, SHA2 or SHA256. As mentioned previously, other types of hash functions can be used in other embodiments. Such hash functions are illustratively configured to generate a fixed-length value utilizing at least the data item, with the fixed-length value having a length that is substantially less than a length of the data item itself. For example, the SHA1 algorithm can be used to produce a 20-byte value from a multi-kilobyte data item, such as a 4 KB, 8 KB or 16 KB block, with the 20-byte value being unique to the particular content of the data item. Multiple instances of the same data item will therefore each produce the same 20-byte value responsive to application of the SHA1 algorithm to the data item.

In the above-described embodiments, the client device 102-1 is illustratively configured to encrypt plaintext data items in such a way that the resulting encrypted data items will be the same if the plaintext data items are the same, so that the deduplication process in the storage array 104 can effectively eliminate duplicate encrypted data items.

As mentioned previously, this is achieved in some embodiments by the client device 102-1 generating a data encryption key that is a function of the plaintext data item and the first secret key. Other techniques may be used in other embodiments to ensure that duplicate plaintext data items yield duplicate encrypted data items.

These embodiments overcome drawbacks of conventional practice, in which even a single client device encrypting the same plaintext data item twice will typically produce two distinct encrypted data blocks, possibly due to use of different initialization vectors (IVs) or use of encryption modes such as XTS in which IVs vary based on location or other factors. Such conventional arrangements therefore tend to prevent the storage array 104 from distinguishing duplicate encrypted data items. Illustrative embodiments overcome this problem by ensuring that the same plaintext when encrypted will always yield the same ciphertext, thereby supporting effective deduplication in the storage array 104. Such embodiments are advantageous in both single-tenant and multiple-tenant storage contexts.

As mentioned previously, the client device 102-1 in some embodiments is configured to encrypt the data encryption key using a second secret key, and to send the encrypted data encryption key to the storage array 104 for storage therein as metadata of the data item. The metadata illustratively comprises a pointer to a storage location of the data item in the storage array 104. In multiple tenant arrangements of this type where the client device 102-1 is associated with a first tenant, the second secret key is not known to the storage array 104 and is not shared by the first tenant with any of the additional tenants.

As noted above, each of the other client devices 102-2 through 102-N is assumed to be configured in a manner similar to that described above for client device 102-1.

Also, the particular arrangements described above are just examples, and numerous other client-side data encryption arrangements can be used to encrypt data items in a manner that supports deduplication in other embodiments.

FIG. 2 shows an example of the above-noted metadata, for multiple data items subject to client-side encryption by the client device 102-1. This metadata 200 represents a portion of the associated metadata 107 maintained by the storage array 104 for stored encrypted data items 106. More particularly, the metadata 200 illustrated in the figure includes identifiers ID1, ID2, . . . IDn of respective data items that were encrypted by the client device 102-1 using respective data encryption keys DEK1, DEK2, . . . DEKn. These data encryption keys are stored as part of the metadata 200, in an encrypted form using a secret key $S_A$ that is known to client device 102-1 but not known to the storage array 104 or to the client devices of any other tenants of the storage array 104. The encrypted data encryption keys are denoted $\{DEK1\} S_A$, $\{DEK2\} S_A$, . . . $\{DEKn\} S_A$ in the figure. The secret key $S_A$ of FIG. 2 is an example of the "second secret key" referred to above and elsewhere herein.

Each of the entries of the metadata 200 further comprises a pointer to the storage location of the corresponding encrypted data item in the storage array 104, and possibly other types of metadata utilized by the storage array 104. It is to be appreciated that this particular arrangement of metadata 200 including identifiers of encrypted data item, encrypted data encryption keys, pointers and possibly other types of metadata, is only an example, and not intended to be limiting in any way. Other tenants for which encrypted data items are stored by the storage array 104 will each have an arrangement of metadata similar to metadata 200 of FIG. 2 for its particular stored encrypted data items.

Additional examples of the client-side encryption performed in system 100 will now be described in more detail. In these examples, it is assumed that the client devices comprise or are otherwise associated with respective distinct tenants of the storage array 104. Thus, a given "client" may be referred to as a tenant, and vice-versa. The data items in these examples are referred to as "blocks" but other types of data items can be used in other embodiments, such as sets of multiple blocks.

In one example, there are three distinct tenants denoted A, B and C in the same deduplication domain. These three tenants are assumed to be associated with respective ones of the client devices 102. Accordingly, tenant A is associated with client device 102-1 and tenants B and C are associated with respective other ones of the client devices 102. The three tenants A, B and C share a secret key $S_{ABC}$, which is an example of the "first secret key" referred to above and elsewhere herein. Additionally, the tenants have respective secret keys $S_A$, $S_B$, and $S_C$, which are not shared among those tenants. Thus, secret key $S_A$ is known only to tenant A and its client device 102-1, secret key $S_B$ is known only to tenant B and its corresponding one of the other client devices 102, and secret key $S_C$ is known only to tenant C and its corresponding one of the other client devices 102. The secret keys $S_A$, $S_B$, and $S_C$ are examples of the "second secret key" referred to above and elsewhere herein.

It is further assumed for this example that a given one of the client devices of tenant A, tenant B or tenant C, illustratively tenant A, has a plaintext data block b to be encrypted for storage in the storage array 104. The client device 102-1 associated with tenant A generates a data encryption key (DEK) for the block b by computing $h(S_{ABC}, b)$, where h denotes a hash function of the type previously described herein. Client device 102-1 encrypts b using the computed DEK, and sends the encrypted data block to the storage array 104 for storage as part of the stored encrypted data items 106. The client device 102-1 also encrypts the DEK using the secret key $S_A$, illustratively as $\{h(S_{ABC}, b)\} S_A$, and sends the encrypted DEK to the storage array 104 for storage as part of the associated metadata 107.

It should be noted that tenants A, B, and C can collaborate on choosing $S_{ABC}$, and not even inform the storage array 104 that they are collaborating in the same deduplication domain. The storage array 104 might notice that blocks stored by tenant A often match with blocks stored by tenant C, but never with blocks stored by tenant F, but otherwise, the storage array 104 would not know which tenants have chosen to be in the same deduplication domain. The storage array 104 need not even be aware that the tenants are sending ciphertext blocks rather than plaintext blocks for storage in the storage array 104.

Also, if tenants in the same deduplication domain apply compression to their respective plaintext data items, each of the tenants in that deduplication domain should utilize the same compression algorithm in order to ensure that deduplication can be performed properly by the storage array 104.

In the present example, each of the tenants A, B and C has its own secret key $S_A$, $S_B$, or $S_C$ that is used to encrypt DEKs but is not used in generating DEKs. Tenants in the same deduplication domain, such as tenants A, B and C, share the common secret key $S_{ABC}$ for deterministically generating a DEK for each block.

The client device 102-1 corresponding to tenant A stores a given block in the storage array 104 in the following manner:

1. Start with a plaintext block M.

2. Compute the DEK for block M as $X=h(S_{ABC}, M)$. Note that many alternative functions of M and $S_{ABC}$ can be used as the DEK X. Other illustrative examples include $X=h(h(M), S_{ABC})$ or $X=\{h(M)\}S_{ABC}$. It is also possible to use MACs, as mentioned previously. All such arrangements are considered examples of functions involving "hashing" at least the data item, as that term is broadly used herein.

3. Encrypt block M using DEK X, with the result denoted as $\{M\}X$.

4. Send the $\{M\}X$ to the storage array 104 for storage therein.

5. Send $\{X\} S_A$ to the storage array 104 for storage in metadata (e.g., an inode pointer) associated with the stored encrypted data block.

The storage array 104 in this example receives the encrypted block $\{M\}X$ from the client device 102-1, and performs deduplication on the encrypted block under the control of the deduplication controller 108. If any two of the tenants A, B and C in the same deduplication domain (sharing the same first secret key $S_{ABC}$) encrypt the same plaintext block M, the resulting encrypted blocks $\{M\}X$ supplied to the storage array 104 will be the same, and can be readily identified as duplicates by the deduplication controller 108. Again, such an arrangement in the present example assumes that if compression is utilized, each of the tenants utilizes the same compression algorithm.

In the above example, there are three distinct tenants A, B and C in a given deduplication domain. However, as another example, there may be only a single tenant in a given deduplication domain.

The foregoing examples configure the client device 102-1 to use a secret key, combined with a hash of the block, to deterministically create a DEK for that block. That DEK-creating key is shared across tenants in the same deduplication domain.

Advantageously, no entity outside the deduplication domain (i.e., no entity other than A, B and C) can mount a guessed plaintext attack. Although tenants in the same deduplication domain will be able to mount guessed plaintext attacks on each other, they will not be able to directly decrypt each other's data. Note that a guessed plaintext attack is inherent in being in the same deduplication domain, even if encryption is done by the storage array 104, so it is not a disadvantage of the foregoing examples. This small vulnerability (i.e., a tenant in a deduplication domain being able to determine if another tenant in the same deduplication domain has a particular plaintext block) is an inherent tradeoff between the storage savings of effective deduplication across multiple tenants versus a small security downside. It is expected that a given tenant will agree to be in the same deduplication domain only with specific other tenants, each of which exhibits a sufficient level of trustworthiness.

These and other illustrative embodiments provide client-side encryption techniques that support effective deduplication without the need to disclose any secret keys to the storage array 104. Such embodiments are therefore well suited for use in those storage applications in which the clients do not trust a storage system with access to plaintext data or encryption keys for encrypted data.

It is to be understood that the particular set of elements shown in FIG. 1 for implementing client-side encryption supporting deduplication across single or multiple tenants is presented by way of illustrative example only, and in other embodiments additional or alternative elements may be used. Thus, another embodiment may include additional or alternative systems, devices and other entities, as well as different arrangements of modules and other components.

For example, other embodiments can configure the client device 102-1 to include an input-output controller that operates in cooperation with a cryptographic module, or other arrangements of components similarly configured to control storage of encrypted data items in the storage array 104. Such an input-output controller can obtain keys from the cryptographic module for use in performing client-side encryption of data items for storage in the storage array 104. In an embodiment of this type, the encryption and decryption modules 112 and 114 can be implemented in the input-output controller rather than in the cryptographic module. Alternatively, the input-output controller can include its own encryption and decryption modules, in addition to those of the cryptographic module. Other placements of encryption and decryption modules are possible in other embodiments.

It is also possible that the cryptographic module can be implemented at least in part within the input-output controller, or that the input-output controller can be implemented at least in part within the cryptographic module.

At least portions of the client devices 102 and storage array 104 may be implemented using one or more processing platforms. A given such processing platform includes at least one processing device comprising a processor coupled to a memory, and the one or more processing devices may be implemented at least in part utilizing one or more virtual machines or other types of virtualization infrastructure such as Linux containers (LXCs) in association with underlying physical hardware.

It is to be appreciated that a given embodiment of the system 100 may include multiple instances of the storage array 104 and its deduplication controller 108, although only a single instance of each of these elements is shown in the system diagram for clarity and simplicity of illustration.

Accordingly, the particular set of components implemented in the system 100 as illustrated in FIG. 1 is presented by way of example only. In other embodiments, alternative sets of components may be used, and such components may exhibit alternative functionality and configurations.

An example illustrating the operation of the information processing system 100 will now be described with reference to the flow diagram of FIG. 3. The process as shown includes steps 300 through 310, and is suitable for use in the system 100 but is more generally applicable to other systems implementing client-side encryption supporting deduplication across single or multiple tenants as disclosed herein. Also, the process represents just one example of a type of client-side encryption that can be implemented in a client device, and a wide variety of alternative arrangements can be used. In the following description of the process, the client device performing the client-side encryption is referred to as simply a "client." Such a client may be one of a plurality of tenants of a deduplication domain of a storage array or other type of storage system, with each such tenant of the deduplication domain also being referred to herein as a "member" of the deduplication domain. It is also possible that the client is the only tenant in the deduplication domain, or that the storage system supports only a single deduplication domain for multiple tenants.

In step 300, the client identifies a plaintext data item to be encrypted for storage in the storage array. For example, the client can retrieve the plaintext data item from its local memory or other local storage device, for subsequent encryption and delivery in encrypted form to the storage array. As mentioned previously, other embodiments can utilize other types of storage systems.

In step 302, the client computes a data encryption key for the data item as a function of a first secret key of the client and the data item. The function in some embodiments includes hashing at least the data item. Numerous examples of functions providing such hashing of at least the data item are provided elsewhere herein. Other types of functions not necessarily involving hashing of at least the data item can alternatively be used. The first secret key is illustratively a secret key that is shared among multiple tenants of a deduplication domain in those embodiments that involve such multiple-tenant arrangements.

In step 304, the client encrypts the data item using the data encryption key and sends the encrypted data item to the storage array for storage therein. For example, the storage array 104 illustratively stores the encrypted data item as one of the stored encrypted data items 106 in the FIG. 1 embodiment.

In step 306, the client encrypts the data encryption key using a second secret key of the client and sends the encrypted data encryption key to the storage array for storage therein as metadata of the data item. For example, the storage array 104 illustratively stores the encrypted data encryption key as part of the associated metadata 107 in the FIG. 1 embodiment.

In step 308, a determination is made as to whether or not the client has additional data items to encrypt for storage in the storage array. If there is at least one additional data item remaining to be encrypted for storage in the storage array, the process returns to step 300 to identify the particular data item for encryption. Otherwise, the process moves to step 310 as indicated.

In step 310, the storage array performs deduplication over encrypted data items of one or more tenants, without having any knowledge of their secret keys, such as the first and second secret keys of the client referred to in steps 302 and 306.

Figure 3:
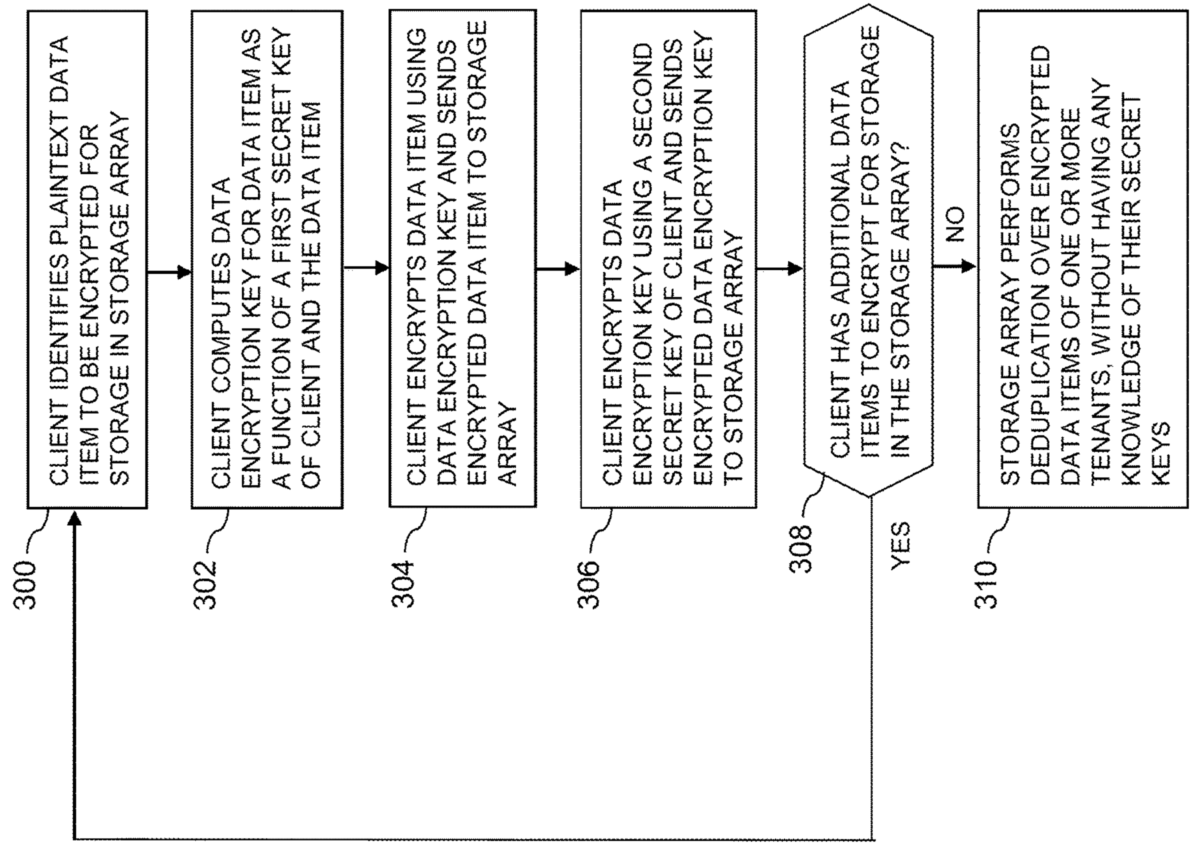
FIG. 3 is a flow diagram of an example client-side encryption process supporting deduplication across single or multiple tenants of a storage system in an illustrative embodiment.

The client-side encryption process of FIG. 3 advantageously supports efficient deduplication across single or multiple tenants of the storage array.

As mentioned previously, although the present embodiment assumes that a unique data encryption key is used for each data item, it is possible in other embodiments to utilize the same data encryption key for multiple data items.

Also, it should be understood in this regard that the term "data item" as used herein is intended to be broadly construed so as to encompass, for example, a block, file, object or other grouping of data suitable for storage in the storage system.

The exemplary FIG. 3 client-side encryption process ensures that a given data item presented for storage in the storage array by multiple tenants is stored only once, encrypted under the data encryption key for that data item, but is associated with metadata that illustratively includes a pointer to the single copy of the stored encrypted data item. Thus, each tenant that presented the encrypted data item for storage in the storage array can access the stored encrypted data item, but duplicate copies of the data items are detected and eliminated, and storage efficiency is improved.

The FIG. 3 process may be viewed as an example of a processing algorithm carried out in the system 100 by cooperative interaction of a given one of the client devices 102 and the storage array 104. As mentioned previously, each of the client devices 102 is assumed to be configured to execute such a processing algorithm in performing client-side encryption of data items for storage in the storage array 104. For example, key generator 110 of client device 102-1 illustratively performs step 302, and encryption module 112 of client device 102-1 illustratively performs at least portions of steps 304 and 306. The deduplication controller of storage array 104 illustratively performs step 310.

In the FIG. 3 embodiment, the storage array performs deduplication in step 310 after the client has encrypted all of its data items and sent the encrypted data items to the storage array for storage therein. However, other arrangements are possible. For example, the storage array can instead check each received encrypted data item for duplication before it is stored as an encrypted data item in the storage array.

The particular processing operations and other system functionality described in conjunction with the flow diagram of FIG. 3 are presented by way of illustrative example only, and should not be construed as limiting the scope of the invention in any way. Alternative embodiments can use other types of processing operations involving client-side encryption and associated deduplication across single or multiple tenants. For example, the ordering of the process steps may be varied in other embodiments, or certain steps may be performed concurrently with one another rather than serially. As additional examples, different instances of the process can be performed for different sets of data items or different client devices, and such instances can be performed at least in part in parallel with one another within a given system for different data sets or different client devices.

Also, functionality such as that described in conjunction with the flow diagram of FIG. 3 can be implemented at least in part in the form of one or more software programs stored in memory and executed by a processor of a processing device such as a computer or server. As mentioned previously, a client device memory or other storage device having executable program code of one or more software programs embodied therein is an example of what is more generally referred to herein as a "processor-readable storage medium."

The foregoing embodiments are therefore illustrative only, and should not be viewed as limiting the scope of any particular embodiment in any way. Those skilled in the art will appreciate that numerous alternative per-tenant key arrangements can be used in other embodiments.

Illustrative embodiments provide a number of significant advantages relative to conventional arrangements.

For example, one or more such embodiments advantageously facilitate implementation of deduplication processes across single or multiple tenants in a storage system, while also avoiding the need for any given tenant to disclose its data encryption keys or other secret keys to the storage system that performs the deduplication process.

These embodiments are configured to ensure that single or multiple tenants that encrypt the same plaintext data item multiple times will produce the same encrypted data item each time, thereby allowing the storage system to detect duplicate encrypted data items.

Such embodiments can provide more efficient use of storage resources in single-tenant or multi-tenant storage systems, potentially leading to cost and complexity reductions and associated performance improvements.

Illustrative embodiments are advantageously configured to ensure that plaintext guessing attacks are not possible for any entity other than other tenants that share the same deduplication domain.

Moreover, these and other embodiments do not require any changes to the deduplication process performed by the storage system.

The above-noted advantages and other advantages described herein are present in certain illustrative embodiments and need not be present in other embodiments.

As indicated previously, components of a client device as disclosed herein can be implemented at least in part in the form of one or more software programs stored in memory and executed by a processor of a processing device. For example, at least portions of the client-side encryption functionality of a given one of the client devices 102 are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, client devices, and storage systems, as well as related components such as deduplication controllers. Also, the particular features of the illustrative embodiments of FIGS. 1-3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:

a client device configured for communication with a storage system;

the client device comprising a processor coupled to a memory;

the client device being further configured:

to identify a data item to be stored in the storage system;

to generate a data encryption key for the data item as a function of both (i) a first secret key of the client device and (ii) the data item, the data encryption key thereby being generated utilizing both the first secret key and the data item;

to encrypt the data item using the data encryption key for the data item;

to send the encrypted data item to the storage system for storage therein;

to encrypt the data encryption key using a second secret key; and to send the encrypted data encryption key to the storage system for storage therein as metadata of the data item.

2. The apparatus of claim 1 wherein the metadata comprises a pointer to a storage location of the data item in the storage system.

3. The apparatus of claim 1 wherein the function of the first secret key and the data item comprises hashing at least the data item.

4. The apparatus of claim 1 wherein the data encryption key is generated at least in part by applying a hash function to the first secret key and the data item.

5. The apparatus of claim 1 wherein the data encryption key is generated at least in part by applying a first hash function to the data item to obtain a result, and applying a second hash function to the first secret key and the result.

6. The apparatus of claim 1 wherein the data encryption key is generated at least in part by applying a hash function to the data item to obtain a result, and encrypting the result using the first secret key.

7. The apparatus of claim 3 wherein hashing at least the data item comprises generating a message authentication code utilizing at least the data item.

8. The apparatus of claim 3 wherein hashing at least the data item comprises generating a fixed-length value utilizing at least the data item with the fixed-length value having a length that is less than a length of the data item itself.

9. The apparatus of claim 1 wherein the client device is associated with a first tenant of a deduplication domain of the storage system and the deduplication domain includes one or more additional tenants, and wherein the first secret key is not known to the storage system but is shared by the first and additional tenants of the deduplication domain.

10. The apparatus of claim 9 wherein the storage system comprises a cloud storage system and the tenants comprise respective tenants of the cloud storage system.

11. The apparatus of claim 9 wherein the first and additional tenants of the deduplication domain each utilize the first secret key and a common hash function in generating their respective data encryption keys so as to permit the storage system to identify duplicate encrypted data items submitted by one or more of the tenants of the deduplication domain.

12. The apparatus of claim 11 wherein the common hash function comprises a particular designated secure hashing algorithm.

13. The apparatus of claim 1 wherein the client device is associated with a first tenant of a deduplication domain of the storage system and the deduplication domain includes one or more additional tenants and wherein the second secret key is not known to the storage system and is not shared by the first tenant with any of the additional tenants.

14. A method comprising:

identifying a data item to be stored in a storage system;

generating a data encryption key for the data item as a function of both (i) a first secret key of the client device and (ii) the data item, the data encryption key thereby being generated utilizing both the first secret key and the data item;

encrypting the data item using the data encryption key for the data item;

sending the encrypted data item to the storage system for storage therein;

encrypting the data encryption key using a second secret key; and sending the encrypted data encryption key to the storage system for storage therein as metadata of the data item;

wherein the identifying, generating, encrypting and sending are implemented in a client device comprising a processor coupled to a memory and configured to communicate with the storage system.

15. The method of claim 14 wherein the client device is associated with a first tenant of a deduplication domain of the storage system and the deduplication domain includes one or more additional tenants, and further wherein the first and additional tenants of the deduplication domain each utilize the first secret key and a common hash function in generating their respective data encryption keys so as to permit the storage system to identify duplicate encrypted data items submitted by one or more of the tenants of the deduplication domain.

16. The method of claim 14 wherein the data encryption key is generated at least in part by applying a hash function to the first secret key and the data item.

17. The method of claim 14 wherein the data encryption key is generated at least in part by applying a first hash function to the data item to obtain a result, and applying a second hash function to the first secret key and the result.

18. The method of claim 14 wherein the data encryption key is generated at least in part by applying a hash function to the data item to obtain a result, and encrypting the result using the first secret key.

19. A computer program product comprising a non-transitory processor-readable storage medium having stored therein program code of one or more software programs, wherein the program code when executed by a client device comprising a processor coupled to a memory, the client device being configured to communicate with a storage system, causes said client device:

to identify a data item to be stored in the storage system;

to generate a data encryption key for the data item as a function of both (i) a first secret key of the client device and (ii) the data item, the data encryption key thereby being generated utilizing both the first secret key and the data item;

to encrypt the data item using the data encryption key for the data item;

to send the encrypted data item to the storage system for storage therein;

to encrypt the data encryption key using a second secret key; and to send the encrypted data encryption key to the storage system for storage therein as metadata of the data item.

20. The computer program product of claim 19 wherein the client device is associated with a first tenant of a deduplication domain of the storage system and the deduplication domain includes one or more additional tenants, and further wherein the first and additional tenants of the deduplication domain each utilize the first secret key and a common hash function in generating their respective data encryption keys so as to permit the storage system to identify duplicate encrypted data items submitted by one or more of the tenants of the deduplication domain.

* * * * *